US010641612B2

(12) United States Patent
Sagall

(10) Patent No.: US 10,641,612 B2
(45) Date of Patent: May 5, 2020

(54) METHOD AND APPARATUS FOR CORRECTING CURRENT POSITION IN NAVIGATION SYSTEM VIA HUMAN-MACHINE INTERFACE

(71) Applicant: Alpine Electronics, Inc., Tokyo (JP)

(72) Inventor: Jason Sagall, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 525 days.

(21) Appl. No.: 15/383,703

(22) Filed: Dec. 19, 2016

(65) Prior Publication Data

US 2018/0172468 A1 Jun. 21, 2018

(51) Int. Cl.
*G01C 21/36* (2006.01)
*G01C 21/20* (2006.01)
*G01C 21/32* (2006.01)
*G01C 21/26* (2006.01)

(52) U.S. Cl.
CPC ......... *G01C 21/3626* (2013.01); *G01C 21/20* (2013.01); *G01C 21/26* (2013.01); *G01C 21/32* (2013.01)

(58) Field of Classification Search
None
See application file for complete search history.

(56) References Cited

U.S. PATENT DOCUMENTS

| 2004/0204830 | A1* | 10/2004 | Esaki | G01C 21/30 |
| | | | | 701/446 |
| 2011/0313779 | A1* | 12/2011 | Herzog | G06Q 10/10 |
| | | | | 705/1.1 |
| 2013/0132140 | A1* | 5/2013 | Amin | G06Q 10/02 |
| | | | | 705/7.13 |
| 2014/0213299 | A1* | 7/2014 | Marti | G06F 3/048 |
| | | | | 455/456.3 |
| 2014/0244167 | A1* | 8/2014 | Reynolds | H04W 64/00 |
| | | | | 701/518 |
| 2015/0345984 | A1* | 12/2015 | Graham | G01C 21/3697 |
| | | | | 701/400 |
| 2016/0117348 | A1* | 4/2016 | Reynertson | G06F 16/29 |
| | | | | 707/769 |

FOREIGN PATENT DOCUMENTS

JP    P5640146    10/2014

* cited by examiner

*Primary Examiner* — Todd M Melton
*Assistant Examiner* — Jason R Roberson
(74) *Attorney, Agent, or Firm* — Muramatsu & Associates

(57) ABSTRACT

A method and apparatus are provided for correcting position error in a navigation system by utilizing user input received via a human-machine interface, where the user input indicates the location of a user as perceived by the user. The navigation system includes a positioning module, navigation sensors, a map database and a human-machine interface that are employed to calculate and display the current position to the user. The method and apparatus are advantageously used in situations with intermittent or unavailable GPS signal, cumulative navigational sensor errors, and cases where map database information is incorrect. The positioning module receives and processes user input from the human-machine interface and analyzes the user input against the result of a map-matching algorithm to correct positioning errors.

8 Claims, 9 Drawing Sheets

METHOD AND APPARATUS FOR CORRECTING CURRENT POSITION IN NAVIGATION SYSTEM VIA HUMAN-MACHINE INTERFACE

FIELD OF THE INVENTION

This invention relates to a method and apparatus for correcting a position calculated and displayed in a navigation system. More particularly, the present invention is an improvement that relates to the utilization of input by a user through a human-machine interface in order to correct the current position of the user as calculated and displayed by the navigation system.

BACKGROUND OF THE INVENTION

Navigation systems store and analyze data gathered by navigation sensors. Typically, such navigation sensors include GPS receivers to receive and process signals to determine the user's absolute position, compasses to measure heading relative to the earth's magnetic field, gyroscopes to measure relative heading, speedometers and accelerometers. In order to determine the position of the user on a digital map, navigation systems employ map-matching algorithms which correlate the GPS data and local navigation sensor data with road link data from a map database.

To provide accurate and timely performance of map matching, as well as continuous guidance information when the user is travelling to a destination along a calculated route, strong, continuous GPS signal is typically necessary. However, GPS signal may become intermittent, degraded or unavailable, for example during travel in tunnels, downtown "urban canyons" with high-rise buildings, rural canyons and mountain areas. In such cases where GPS signal is insufficient, standard current navigation systems resort to dead reckoning (DR) by relying heavily on local navigation sensor data, i.e. speed, acceleration, heading, etc., to match the current position of the user to the map.

Since DR data quickly accumulates error, the navigation system's estimated position of the user after the map-matching process may deviate significantly from the user's actual location. For example, in an area with a single winding road around a canyon or mountain, erroneous DR data combined with weak GPS signal may cause the map-matching process to rate the road below the probability threshold for matching, resulting in an estimated user position that simply drifts off-road. In turn, route guidance is halted, even though the user did not travel off-road in reality. Conversely, in highly populated areas with dense road networks, erroneous DR data may result in map-matching the user position onto a nearby road having a higher matching probability than the road the user is actually travelling on, causing the system to calculate a new route to the destination and provide inapplicable guidance.

In both examples, the user is deprived of correct positioning, route and guidance information, including essential information such as current road name, distance to the next maneuver, voice guidance for upcoming turns and other information about the location and route.

Even in areas with sufficient GPS signal, current navigation systems may fail to correctly estimate the current user position due to errors or deviations in the map database utilized by the navigation system. Information such as road link information and location stored in the map database may not sufficiently align with the actual position of the road in reality and may be significantly offset from actual road position. These discrepancies may cause the navigation system to estimate the user position incorrectly and match it to the wrong road or no road at all. Current known systems do not provide a means to override or correct such errors.

The following examples further describe typical use cases in which navigation systems may fail to accurately match and update the user position relative to the navigation system's map:

Use case 1: The user is following a displayed route to a destination; the user deviates from the route by turning onto a road not on the route, e.g., a nearby parallel road; the estimated user position continues to move on the displayed route which the user is no longer following; current routing and guidance information is no longer applicable.

Use case 2: The user is following a displayed route to a destination; the estimated user position on the navigation system deviates from its correct position on the route and mismatches onto a different road on or off the displayed route, e.g., a nearby parallel road; the system recalculates a route based on the incorrect user position and provides routing and guidance information that is not applicable to the user's actual location.

Use case 3: The user is following a displayed route to a destination; the estimated user position on the navigation system deviates from its correct position on the route to an off-road position on the map; the system suspends routing and guidance information despite the fact that the user is still travelling on a road.

Use case 4: Without a route to a destination, the user is travelling on a digitized road as shown on the navigation system map; the estimated user position on the navigation system mismatches from the correct road onto a different road (e.g., a nearby parallel road); the navigation system displays the estimated user position on the wrong road and displays an incorrect current road name.

Use case 5: Without a route to a destination, the user is travelling on a digitized road as shown on the navigation system map; the estimated user position on the navigation system mismatches from the correct road to an off-road position on the map; the navigation system displays the estimated user position incorrectly and does not display the current road name.

In the examples above, the user often knows at least his approximate location relative to a street, point-of-interest, a landmark, a curve on a road, an intersection of two or more roads or other identifying street, building or land features. Further, the user may be able to identify the same features on the navigation system map, or an upcoming maneuver on the navigation system's calculated route, irrespective of an inaccurately displayed user position.

However, known systems fail to provide an apparatus and method that: (1) enables the user to input his current position on a road, or an upcoming maneuver on a calculated route, as may be known by the user, and (2) utilizes user input to accurately match the user's current position to the correct road link, in particular for cases where the correct road link would not have been chosen by a conventional map-matching process for failing to satisfy its probability threshold.

Therefore, a method and apparatus are needed in navigation systems for the correction of current user position by utilizing user knowledge and input to correct or override positioning errors arising from lack of sufficient GPS signal, accumulated DR error, or deviations in map database information.

SUMMARY OF THE INVENTION

An object of the present invention is to provide a method and apparatus for a navigation system to receive and process user input to correct positioning errors arising from lack of GPS signal, accumulated DR error or discrepancies in the map database.

Another object of the invention is to provide a navigation system which comprises a human-machine interface (HMI) that enables a user to interact with the navigation system and invoke a vehicle position (VP) correction process by receiving input from the user indicating the user location as perceived by the user. Such input may be in the form of a selection of a road name, a maneuver based on a calculated route to a destination, a point-of-interest (POI) name or other reference point.

Another object of the invention is to provide a method for utilizing user input indicating user location as perceived by the user as a parameter in a positioning module in order to correct errors resulting from conventional map-matching typically in conditions of insufficient GPS signal, accumulated DR errors or discrepancies in map database information.

The foregoing and other objects and advantages are realized by providing a method for correcting positioning errors in a navigation system, the method comprising the steps of: receiving and recording movement measurements detected by one or more navigation sensors; receiving from the user, via the HMI, an invocation to correct the VP; examining a map database and the sensor data to identify candidate positions for current VP; presenting to the user, via the HMI, candidate items such as road links, maneuvers on a calculated route, and/or POI that correlate to the candidate positions; receiving from the user, via the HMI, a selection from the candidate positions, the selection indicating a location of the user as perceived by the user; calculating the probability of the selection by a map-matching algorithm; performing an integrity check on the selection, wherein the user selection is validated by determining whether the probability of the user selection meets a set probability threshold and/or is within a set probability range; and updating the VP on a digital map image displayed on the HMI in accordance with the integrity check.

DETAILED DESCRIPTION

The present invention will be described in detail with reference to the accompanying drawings. The present invention is directed to a method and apparatus for correcting a current position calculated and displayed by a navigation system by receiving user input via the navigation system HMI, where the user input indicates the position of the user as perceived by the user. This invention is advantageously used in situations where GPS signal or other positioning signals (e.g. cell tower triangulation, Wi-Fi positioning, wide area augmentation system (WAAS), etc.) are unavailable, weak, lost or are otherwise insufficient for accurate map matching by map-matching algorithms.

It should be noted that although the description is made primarily for a vehicle navigation system, the method and apparatus for correcting the current position by a user's input through a human-machine interface can be used for many other devices, such as a portable navigation devices, mobile phones, smart phones, tablet devices, wearable terminals, personal computers, etc. having a navigation function. Thus, the term "vehicle position" and its abbreviation "VP" should be construed as equivalent to "user position", and thus are interchangeable within the context of the present invention.

Figure 1A:
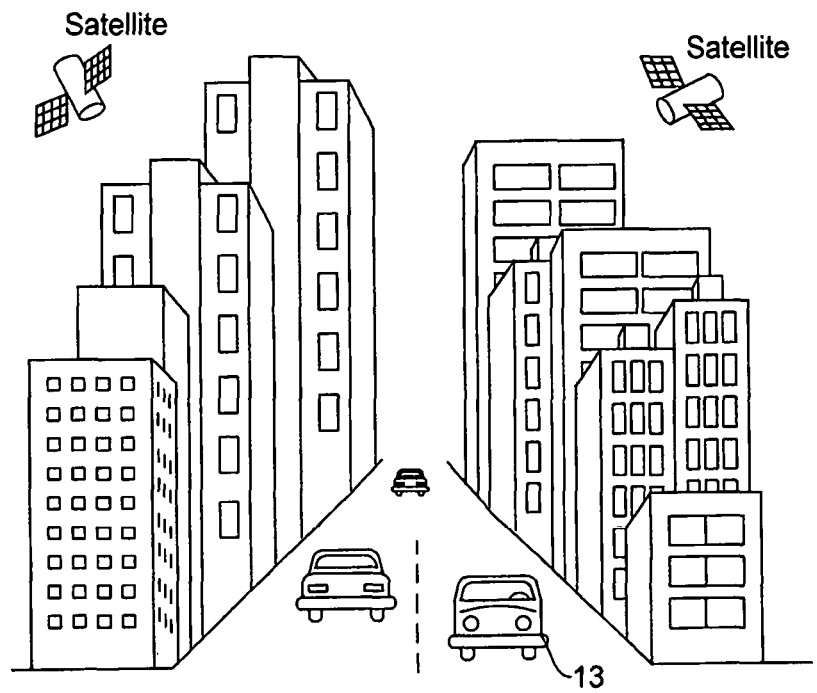
FIG. 1A is an illustration depicting an "urban canyon" where GPS signal from GPS satellites may become weak or lost due to the high density of building structures surrounding the vehicle.
Figure 1B:
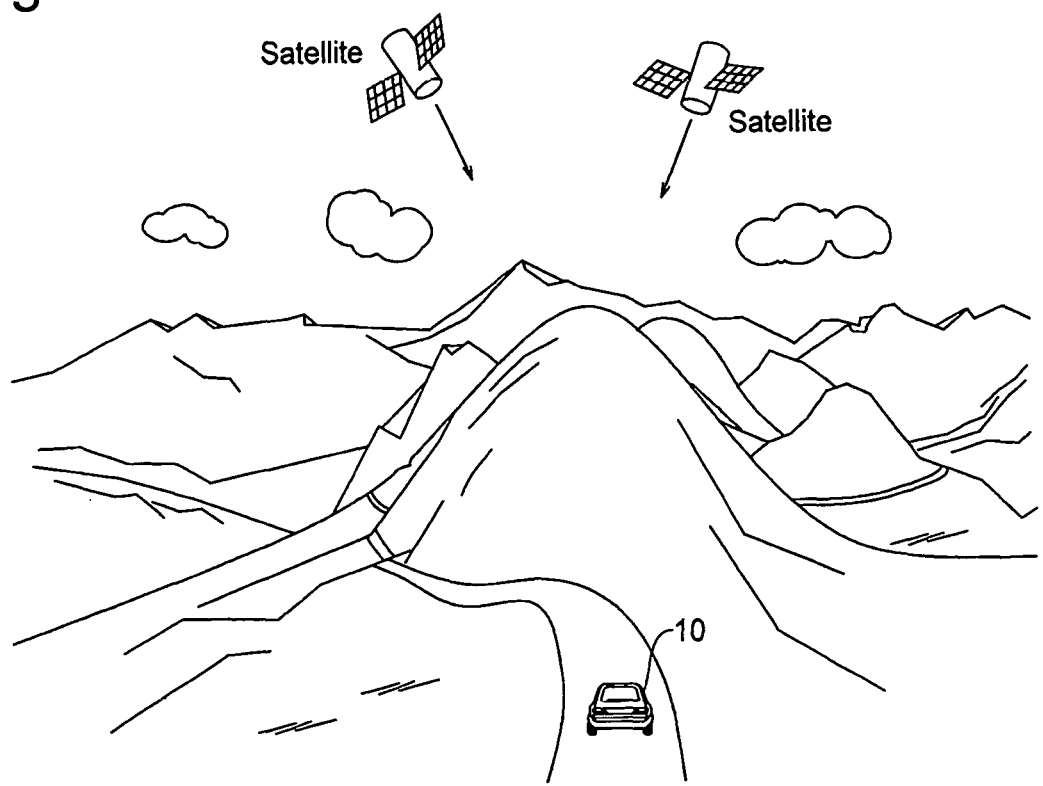
FIG. 1B is an illustration depicting a rural or mountainous area where GPS signal from GPS satellites may become weak or lost due to unavailability or obstruction of GPS signal.

FIG. 1A shows an example situation where GPS signals from GPS satellites may become weak or lost due to the density of building structures surrounding a vehicle 10, i.e., an "urban canyon". The urban canyon situation arises when tall structures surrounding a navigation system disrupt proper reception of GPS signals by the navigation system, resulting in poor or intermittent GPS reception. FIG. 1B shows another example situation where GPS signals from GPS satellites are weak or lost due to mountains surrounding the vehicle 10 or otherwise poor or unavailable signals when the vehicle is travelling on roads winding around mountain and canyon areas. FIG. 1D shows yet another example situation were no positioning signals, e.g., GPS, cellular, Wi-Fi, etc., are available while the vehicle traverses an underground or underwater tunnel.

Hereafter, such situations shown in FIGS. 1A, 1B and 1D where positioning signals are weak, lost or unavailable will be also, referred to as "positioning signal loss" or "signal loss".

Such loss of positioning signals may cause conventional map matching in typical navigation systems to produce VP errors. Map matching is a well-known process by which the navigation system utilizes data from local navigational sensors such as a compass, gyroscope, accelerometer, and signals received by GPS, cellular, Wi-Fi receivers, together with map database information to determine the current position of a user or vehicle and display the map-matched position on the navigation system HMI display.

During signal loss, since there is insufficient or unavailable GPS, cellular or Wi-Fi signal, conventional navigation systems frequently are unable to compensate by dead reckoning ("DR") to estimate the vehicle position, wherein the navigation system utilizes only the movement information detected by the local navigation sensors (i.e. compass, gyroscope, speedometer, accelerometer, etc.) to determine the VP. Such local navigation sensors are subject to noise and offset that quickly accumulate over time, and causes the navigation system to produce errors in VP calculation. Errors in calculating and displaying VP then renders route guidance ineffective and other navigation system features useless.

Figure 1C:
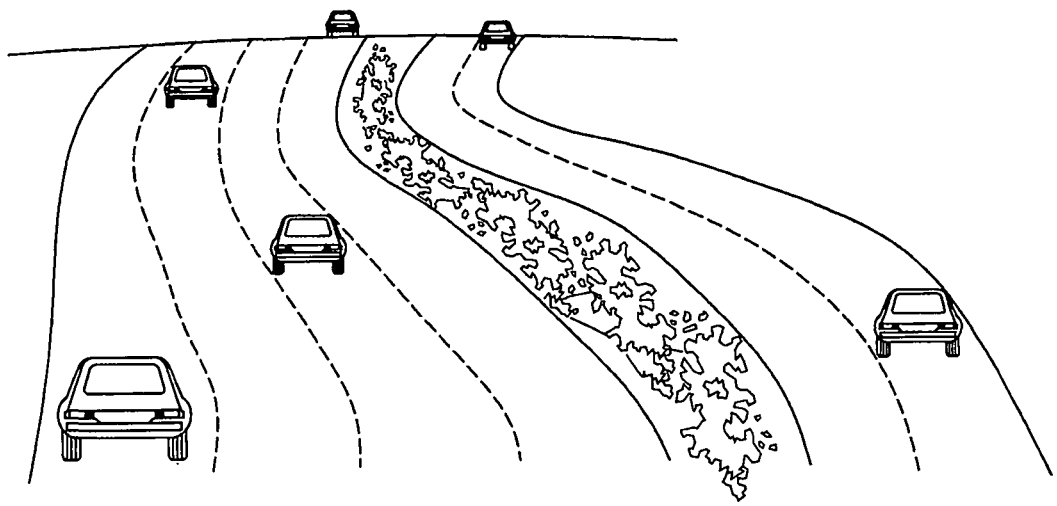
FIG. 1C is an illustration depicting a multilane highway parallel to a service road.
Figure 1D:
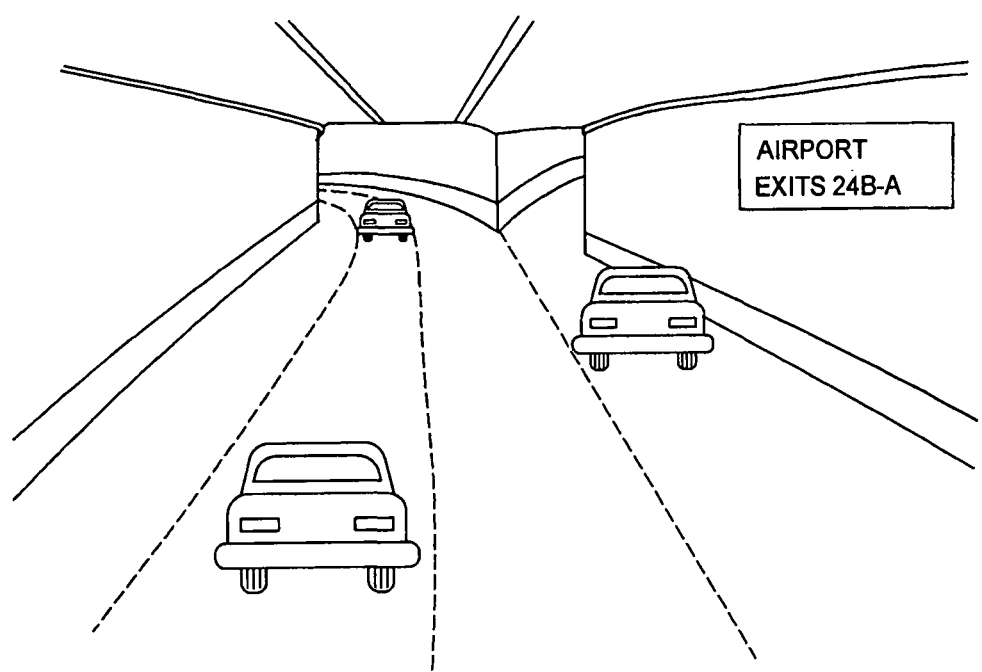
FIG. 1D is an illustration depicting a multilane highway inside a tunnel structure with exits leading to surface roads.

FIG. 1C shows an example situation where a large multilane highway 11 and a small service road 12 run parallel to each other. Such highly populated and frequented areas typically do not have issues with poor GPS, cellular or Wi-Fi coverage. Nonetheless, map matching errors in navigation systems may still occur in such areas. Since the large multilane highway 11 may be used more frequently by more vehicles as compared to the small service road 12, such frequency information may be encoded in the map database and weighed heavily as a factor in a conventional map-matching algorithm. Thus, the map matching algorithm may calculate a probability of the VP on the multilane highway 11 as higher than on the service road 12, despite the fact that the vehicle may actually be travelling on the service road 12 in reality.

Another exemplary situation arises due to offset in road link information, especially in the case of large multilane highways. The road links may be digitized over the rightmost or leftmost lane or shifted even further such that the digitized road is not aligned with the actual highway at all. For example, if the user is travelling on the multilane highway 11 in the rightmost lane, which is the lane farthest from the encoded road link location for multilane highway 11, conventional map-matching algorithms may calculate a probability of the VP on the service road 12 as higher than on the multilane highway 11, and thus incorrectly match the VP to the service road 12.

The situations described above for FIG. 1C result in VP mismatches and route recalculations that yield incorrect routing and incorrect navigation guidance output to the user, including incorrect placement of the VP icon on the map display, incorrect current road name, incorrect distance to the next maneuver, and incorrect voice guidance.

Figure 2A:
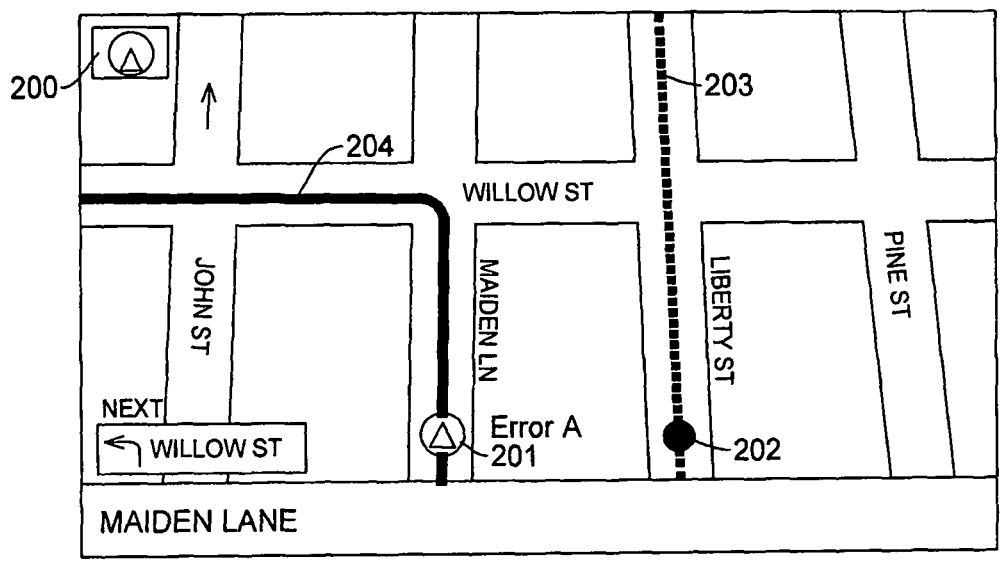
FIG. 2A is a schematic map view displayed on a navigation system HMI. The map view example of FIG. 2A illustrates a situation where VP error occurs due to urban canyon conditions such as shown in FIG. 1A.

FIG. 2A is a schematic map view displayed on a navigation system HMI showing an incorrect VP 201 calculated by the navigation system in an urban canyon situation as illustrated in FIG. 1A during signal loss. The actual VP 202 is displayed for reference. The exemplary situation depicted in FIG. 2A shows that the user had been traversing a calculated route 203, however map matching snapped the VP to an incorrect road segment (Error A), and the incorrect VP 201 caused the navigation system to recalculate to a new route 204 even though in reality the user is still traversing the originally calculated route 203.

Figure 2B:
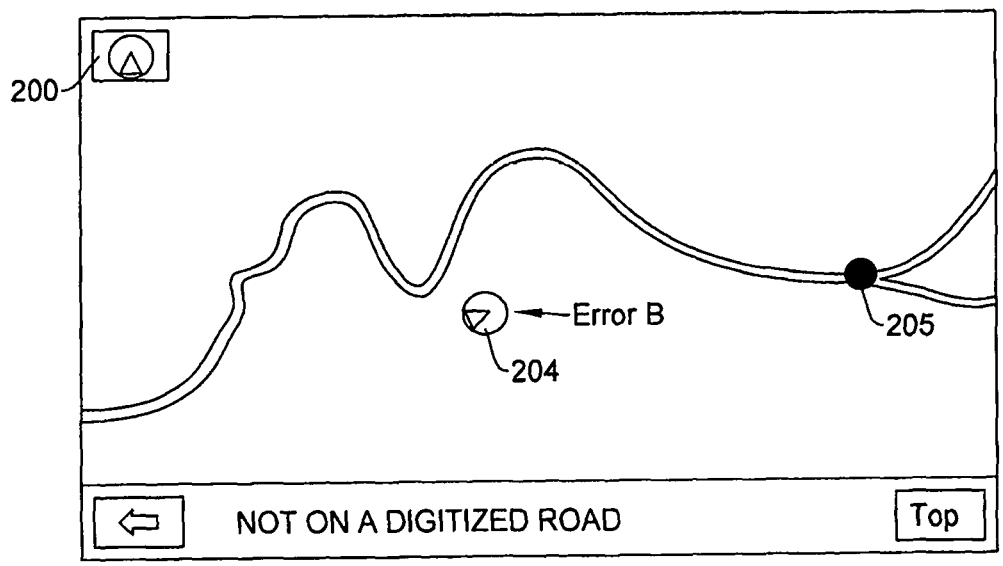
FIG. 2B is a schematic map view displayed on a navigation system HMI. The map view example of FIG. 2B illustrates a situation where VP error occurs due to poor or unavailable GPS signal in a rural or mountainous area such as shown in FIG. 1B.

FIG. 2B is a schematic map view displayed on a navigation system HMI showing an incorrect VP 204 calculated by the navigation system when GPS reception is poor such as the conditions illustrated in FIG. 1B. The actual VP 205 is displayed for reference. Due to insufficient GPS signal and accumulated DR errors, and as the location is a rural area with a sparse road network, map matching has failed and displays the VP off road (Error B).

Figure 2C:
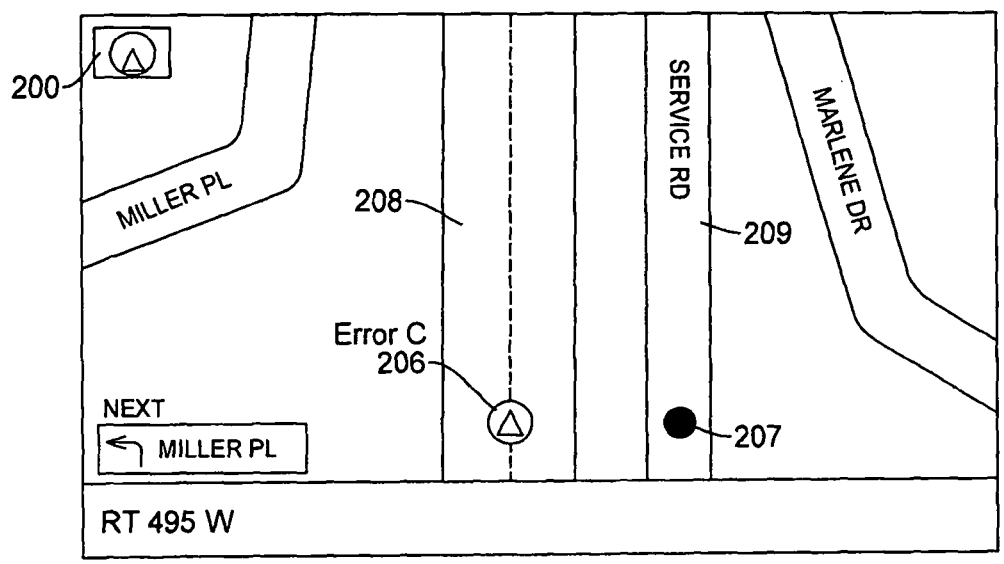
FIG. 2C is a schematic map view displayed on a navigation system HMI. The map view example of FIG. 2C illustrates a situation where VP error occurs due to incorrect map matching such as in conditions depicted in FIG. 1C.

FIG. 2C is a schematic map view displayed on a navigation system HMI showing an incorrect VP 206 (Error C) calculated by the navigation system resulting from deficiencies in the map database information, such as in a highway-service road situation as illustrated in FIG. 1C. The actual VP 207 is displayed for reference. Although the vehicle is actually traversing the small service road 209, map matching has erroneously selected the multilane highway 208 for the vehicle position. Even though positioning signals may be sufficient in this area, the multilane highway 208 may have such a high probability that map matching has selected it for the VP. Alternatively, discrepancies in the road link information encoded in the map database may also result in map matching error.

Figure 2D:
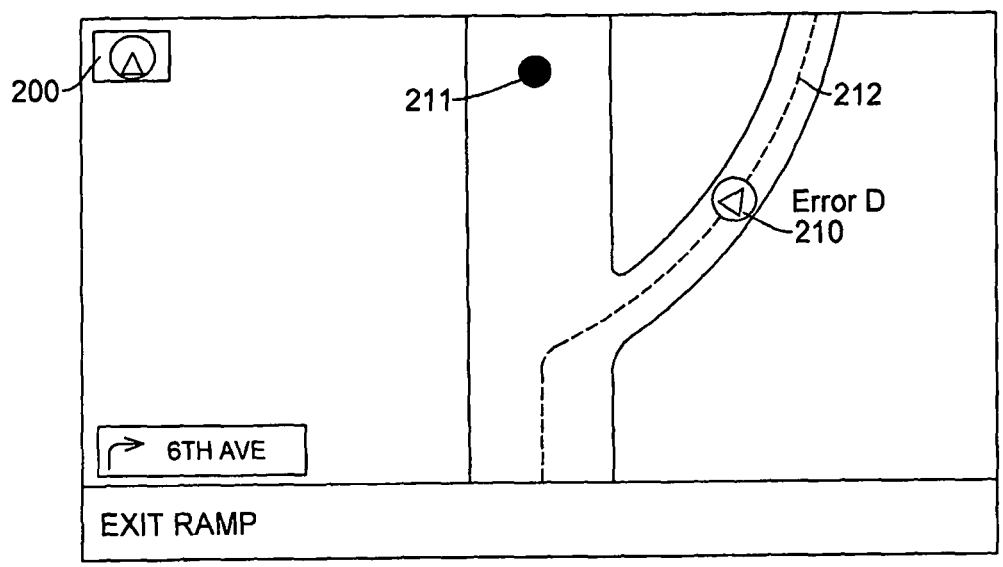
FIG. 2D is a schematic map view displayed on a navigation system HMI. The map view example of FIG. 2D illustrates a situation where VP error occurs due to unavailable GPS signal in a tunnel such as depicted in FIG. 1D.

FIG. 2D is a schematic map view displayed on a navigation system HMI showing an incorrect VP 210 (Error D) calculated by the navigation system in a tunnel situation as illustrated in FIG. 1D with no positioning signals available. The actual user position 211 is displayed for reference. Although in this situation the user had been traversing a calculated route 212, the user went off-route by continuing straight, passing the routed exit. Since positioning signals are unavailable, map matching will typically favor the calculated route 212 as well as factor DR data, which may have accumulated error in the direction of the routed exit on the calculated route 212. Thus, instead of calculating a new route based on the actual user position 211, the system mismatches the VP 210 and continues to provide guidance for the originally calculated route 212 and incorrectly displays the VP 210 still travelling along the originally calculated route 212.

Figure 3A:
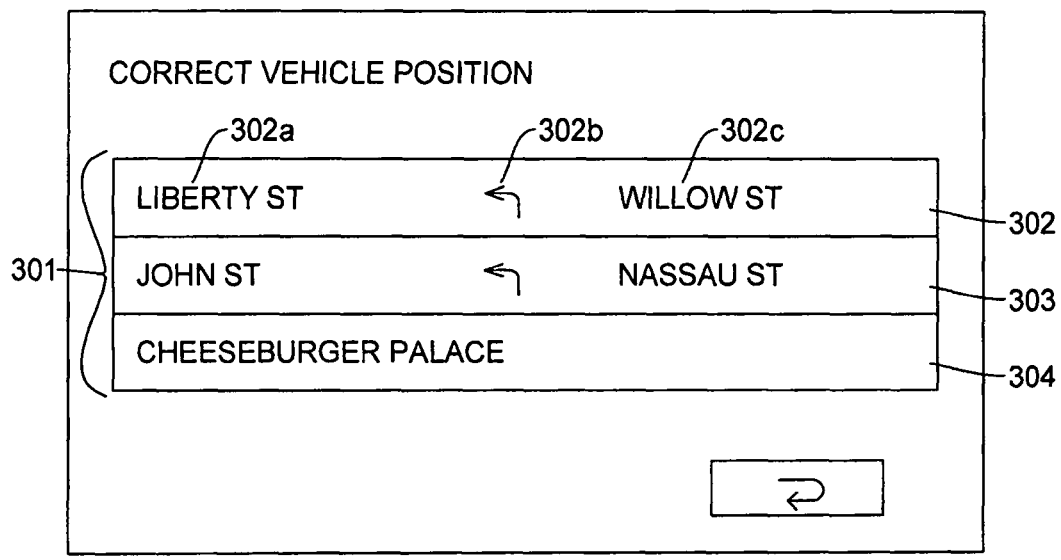
FIG. 3A depicts an exemplary screen displayed by a navigation system HMI which presents a list of candidate roads and/or maneuvers on a calculated route from which a user may select to correct VP.

FIG. 3A is an exemplary screen displayed on a navigation system HMI showing an example candidate list 301 of list items 302, 303 and 304 selectable by the user that is generated after user interaction with the navigation system HMI to invoke VP correction by pressing the on-screen "soft" key 200 in FIG. 2A. Alternatively, the user may invoke VP correction by a plurality of HMI controls, for example a "hard" key on a control panel, a remote controller device and a voice activation system connected to or integrated in the navigation system. The candidate list items 302, 303 and 304 are the result of an initial map-matching calculation performed by the system to determine map locations that have a high probability of being nearby and accessible relative to at least one of: (a) the user's recent trajectory taken from local navigation sensor log data, (b) previously calculated route information, and (c) recent GPS signals of good strength.

If the user is using the navigation system with a calculated route to a destination, the candidate list 301 may include maneuvers on the calculated route as well as maneuvers on other possible calculated routes to the destination based on each respective candidate VP. If the user is not using the navigation system with a calculated route to a destination, the candidate list 301 may include only possible road names or POI names without maneuver information. In the example shown in FIG. 3A, the user is traversing a calculated route and the navigation system displays a candidate list 301 that includes a maneuver 302 on one possible calculated route, a maneuver 303 on another possible calculated route, and the name of a point-of-interest 304 on a candidate road for current VP.

In the example of FIG. 3A, which correlates to the situation in FIG. 2A, the user's recent trajectory indicated by the navigation sensor data was eastbound followed by a change in heading to northbound in the proximity of Maiden Ln., south of Willow St. (as labeled in FIG. 2A). With this information, the map-matching algorithm is able to select a candidate area of the map and specific road links that at least meet a probability threshold for matching. In this example, John St., Maiden Ln., Liberty St., Pine St. and Willow St., as shown in FIG. 2A, fall within the calculated candidate area. However, Maiden Ln. is excluded as a candidate road for VP matching, because the user invoked VP correction when the VP was matched to Maiden Ln. within the candidate area. Pine St. is also excluded as a candidate road, because it is a one-way road southbound, which conflicts with the user's northbound trajectory. Willow St. is similarly excluded, as it runs east-west. Therefore, the candidate list 301 includes Liberty St. and John St. from which the user may select one as the road onto which the VP should be matched.

In this example of FIG. 3A, candidate list item 302 is further comprised of route information, including a "from" road name 302a, a maneuver identifier 302b and a "to" road name 302c, which may be provided by calculating an appropriate route if a destination was set. Further in this example, the candidate list 301 also includes list item 304 displaying a POI name, "Cheeseburger Palace", which the system selected from the map database because of its location on the candidate road Liberty St. List item 304 provides an alternative way the user may identify his location in reality and inform the navigation system when the user does not know the name of the road he is travelling on.

When the user selects one of the list items 302, 303, 304, the navigation system will evaluate the selected candidate against an updated map-matching calculation and determine where to update the VP. This evaluation is described in detail In FIG. 5.

Figure 3B:
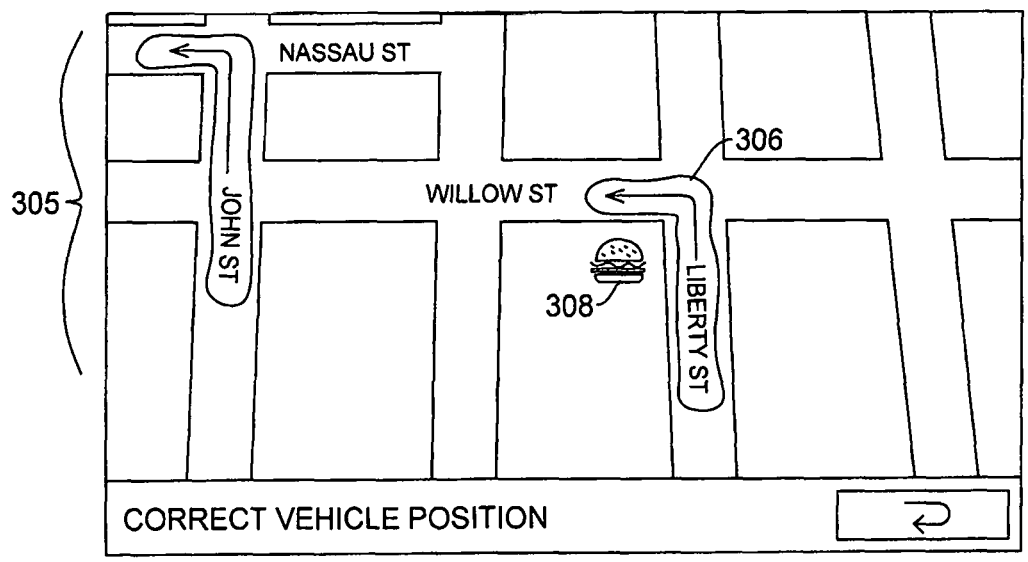
FIG. 3B depicts another exemplary screen displayed by a navigation system HMI which presents candidate roads and/or maneuvers on a calculated route highlighted on a map view from which a user may select to correct VP.

FIG. 3B is another exemplary screen displayed on a navigation system HMI showing a schematic map view with candidate maneuver(s) and/or road(s) that is generated after user interaction with the navigation system HMI to invoke VP correction by pressing the on-screen "soft" key 200 in FIG. 2B. Alternatively, the user may invoke VP correction by a plurality of HMI controls, for example a "hard" key on a control panel, a remote controller device and a voice activation system connected to or integrated in the navigation system. The candidate items 306, 307 and 308 are the result of an initial map-matching calculation performed by the system to determine map locations that have a high probability of being nearby and accessible relative to at least one of: (a) the user's recent trajectory taken from local navigation sensor log data, (b) previously calculated route information, and (c) recent GPS signals of good strength.

In the example shown in FIG. 3B, the user is traversing a calculated route and the navigation system displays a candidate map 305 that includes a maneuver 306 on the calculated route, another maneuver 307 on an alternative route, and a point-of-interest icon 308.

Figure 4:
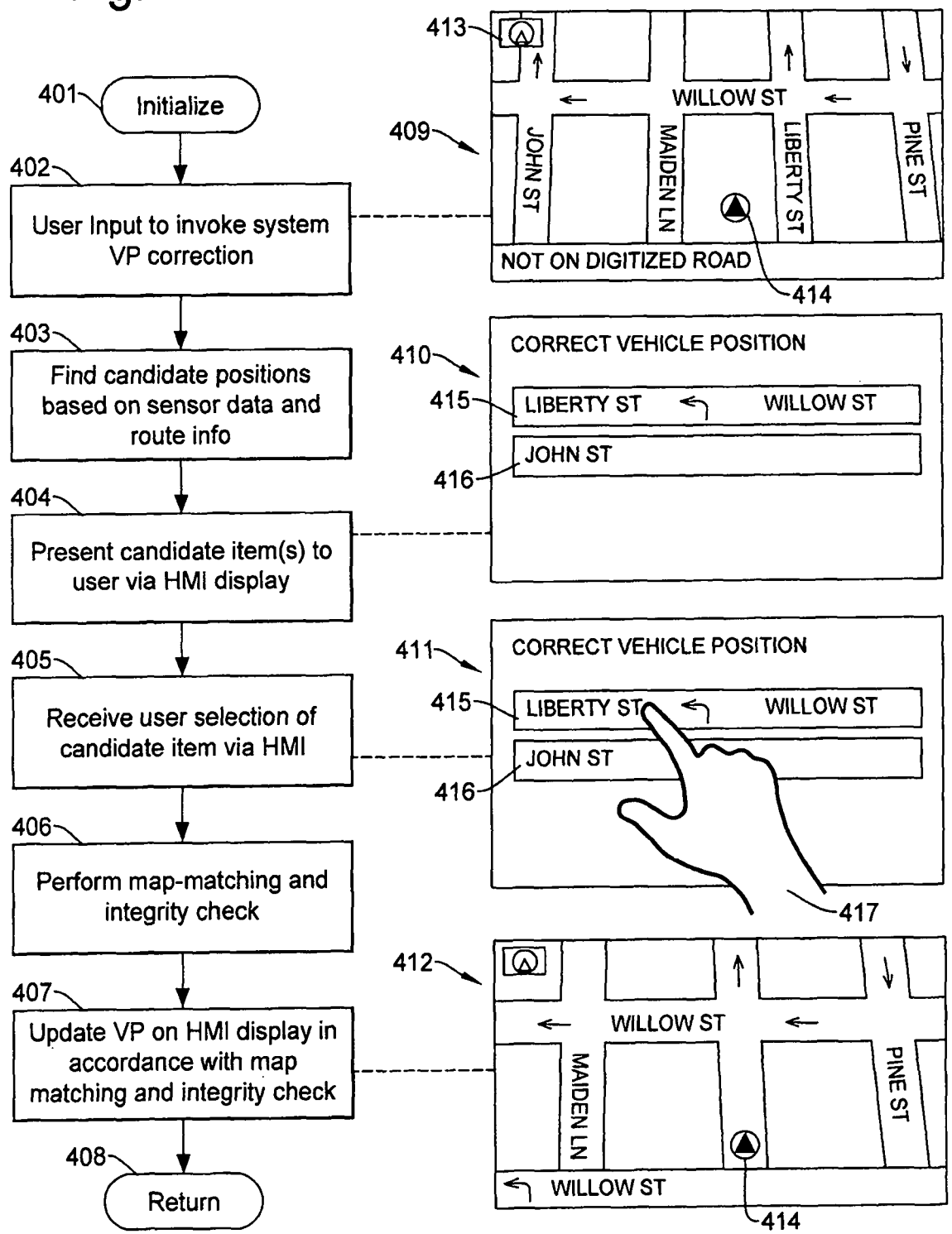
FIG. 4 is a flowchart illustrating exemplary operational steps for correcting VP with corresponding example HMI screens.

FIG. 4 is a flowchart with corresponding exemplary HMI display images illustrating some of the steps included in the process performed by the positioning module and HMI screens displayed to a user in a situation as shown in FIG. 1A. The positioning module is initialized in step 401. In step 402, the positioning module receives a user interaction via the HMI indicating that the VP displayed on the digital map image does not correlate to the location perceived by the user.

The display screen 409 shows an image of a VP icon 414 which has drifted off-road in a situation illustrated by FIG. 1A. The user has been following the navigation system route guidance by travelling on the roads along a calculated route, however due to poor GPS signal, a map matching operation did not match the vehicle position to a digitized road, and thus the system displays the VP icon 414 on an incorrect, off-road position. Accordingly, in step 402, the user invokes VP correction via an HMI control, for example the VP correction "soft" key 413, indicating that the VP displayed on the digital map image does not correlate to the user's current location as perceived by the user.

In step 403, the positioning module performs an initial map-matching operation to select the qualifying candidate road link(s). Further, based on the candidate road link(s) selected, the positioning module checks the map database for POIs located on the candidate road link(s).

In step 404 the HMI displays a screen 410 presenting the candidate list items 415 and 416.

In step 405, the user 417 selects list item 415 by touching the HMI screen 410. In step 406, the positioning module performs an integrity check on the candidate road link correlating to the selection by the user 417 in accordance with the processes illustrated in FIG. 5.

In step 407, the positioning module updates the VP icon 414 displayed on the HMI screen 412 in accordance with the integrity check performed in step 406. In this example, the HMI screen 412 displays the VP icon 414 updated in accordance with the user 417 selection of the candidate list item 415, which passed the integrity check in step 406.

In step 408, VP correction is completed. The navigation system is now able to provide updated guidance information to the user 417. Moreover, since the relocated VP and subsequent movement recorded by the navigation sensors become part of the historical trajectory of the user, continuous map matching immediately following the VP correction is more likely to keep the VP matched to the correct road.

Figure 5:
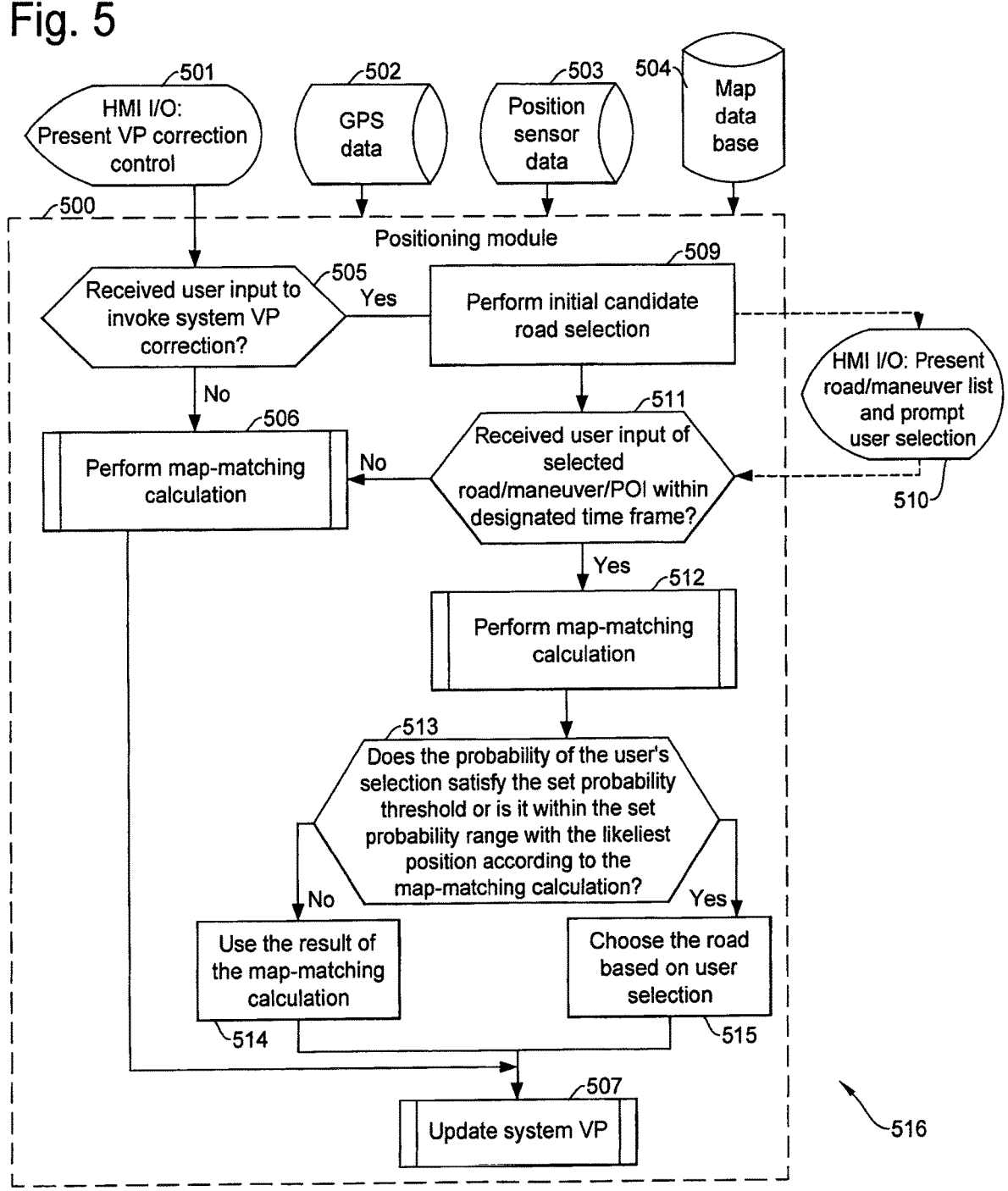
FIG. 5 is a diagram illustrating basic components and exemplary operational steps for correcting the VP.

FIG. 5 is a diagram that illustrates basic components and an exemplary method to correct VP. The navigation system 516 is a combination of hardware and software. The navigation system 516 includes a positioning module 500 that receives GPS data 502 from GPS receivers, position sensor data 503 from local navigation sensors such as compasses, gyroscopes, accelerometers and speedometers, information such as road links and connectives from a map database 504, and user input from the HMI 501.

The positioning module 500 performs the check in step 505 to determine whether user input was received via the HMI 501 to invoke VP correction. If no user input to invoke VP correction is received, at least one map-matching algorithm is executed in step 506, for example point-to-point, point-to-curve, curve-to-curve, which utilizes at least one available data source, for example GPS data 502, local position sensor data 503, and map database 504. Then the VP is updated in step 507 in accordance with the map-matching calculation 506.

When the positioning module 500 performs the check in step 505 and determines that user input to invoke VP correction was received via HMI 501, the positioning module 500 will perform an initial candidate road selection step 509 by utilizing conventional map-matching logic, for example point-to-point, point-to-curve, curve-to-curve and at least one available data source, for example map database 504, local position sensor data 503 and GPS data 502. The candidate road(s) and the correlating POI(s) are then output to the user via the HMI 510, for example as candidate list items 302, 303 and 304 on the display screen shown in FIG. 3A.

If the positioning module 500 does not receive user input of a selected item via the HMI 510 within a designated time frame in step 511, the positioning module 500 will proceed to execute map matching step 506 and the VP update step 507 without user input.

If the positioning module 500 receives user input of a selected item via the HMI 510 within the designated time frame in step 511, the positioning module 500 executes at least one map-matching algorithm in step 512, for example point-to-point, point-to-curve, curve-to-curve, again utilizing at least one available data source, and stores the probability of the road link that the algorithm determines to be the likeliest match, as well as the probability of the road link correlating to the user's selected item via HMI 510.

Step 513 is an integrity check comprising at least a two-part validation process to determine (1) whether the probability, stored in step 512, of the road link correlating to the user's selection meets a map-matching probability threshold, and (2) whether the probability of the road link correlating to the user's selection is within a range of the probability of the road link that the algorithm in step 512 determined to be the likeliest match. The order of the parts of the integrity check in step 513 is shown as a preferred example, however each part of the validation process may proceed in any order. If at least one part of the integrity check in step 513 evaluates to true, the confidence in the user's selection is high enough such that the positioning module 500 will choose in step 515 the road link correlating to the user's selection and update the VP in step 507 based on that choice in step 515 as well as the updated sensor data to compensate for distance travelled, resulting in a VP match proximate to and projected from the road link correlating to the user's selection. However, if both parts of the integrity check in step 513 evaluate to false, the positioning module 500 will proceed in step 514 with the result of the map-matching calculation in step 512, wherein the internal integrity check of the map matching algorithm in step 512 will decide whether or not the road link that the algorithm rated to be the likeliest match will be utilized in the VP update in step 507.

For the following two examples, assume that the integrity check in step 513 has a map-matching probability threshold of 80% and an acceptable probability range of 15 percentage points.

Example 1

If the probability of the road link rated by the algorithm to be the likeliest match is 55%, and the probability of the road link correlating to the user's selection is 50%, then the probability threshold was not met and the first part of the integrity check fails; however, the variance of 5 percentage points is within the acceptable probability range, therefore the second part of the integrity check passes, and the positioning module 500 will choose the road link correlating to the user's selection.

Example 2

If the probability of the road link rated by the algorithm to be the likeliest match is 98%, and the probability of the road link correlating to the user's selection is 80%, then the probability threshold was met and the first part of the integrity check passes. Therefore, despite the fact that the variance of 18 percentage points is outside the acceptable probability range, thereby failing the second part of the integrity check, the positioning module 500 will choose the road link correlating to the user's selection.

Figure 6:
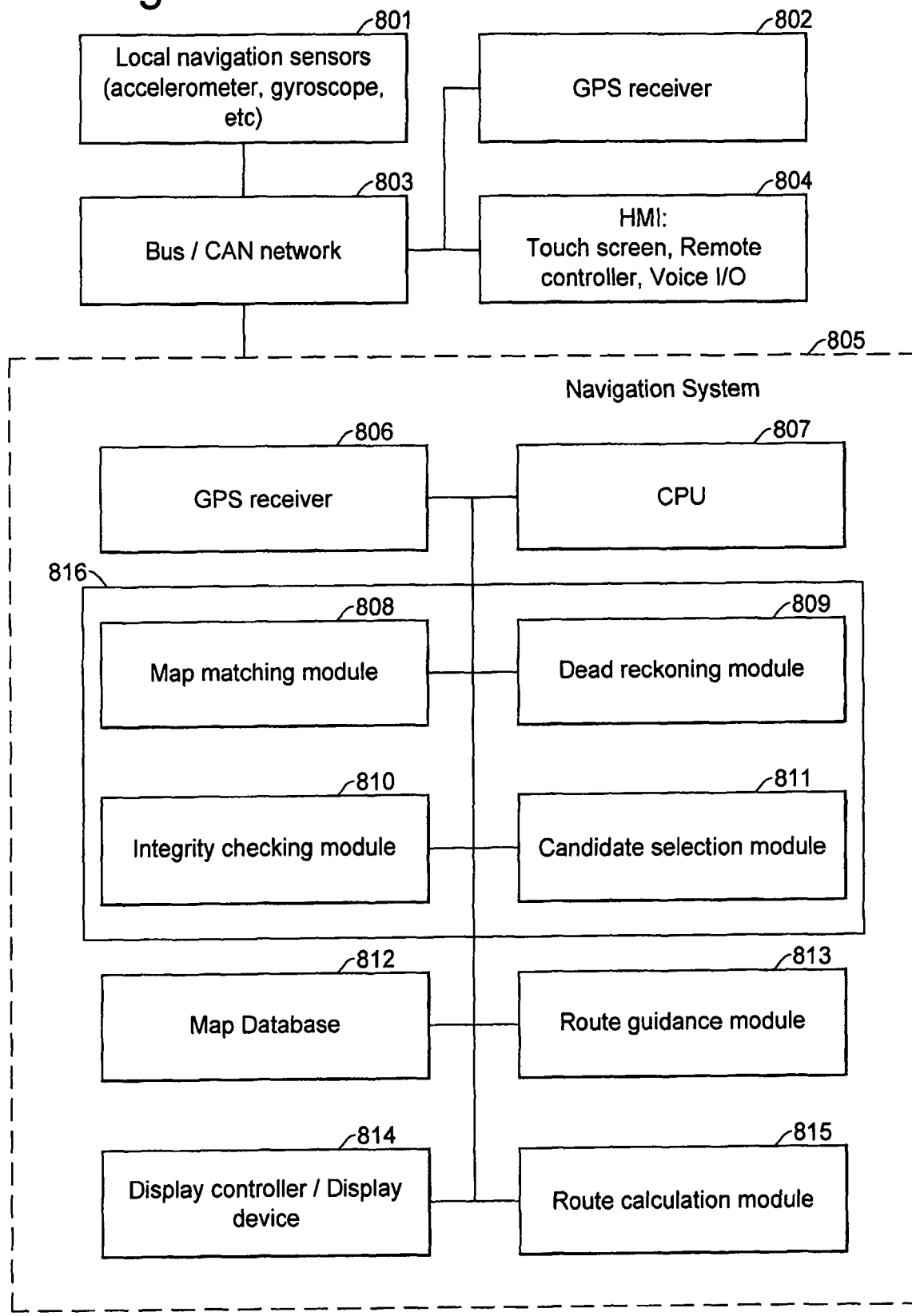
FIG. 6 is a functional block diagram illustrating exemplary basic software and hardware components for executing the VP correction method under the current invention.

FIG. 6 is a functional block diagram showing functional components to correct the vehicle position on the navigation system via the human-machine interface under the present invention. The navigation system 805 is represented by dotted lines and is comprised of a plurality of modules encircled by the dotted lines. The navigation system 805 may be implemented on a portable device such as a portable GPS navigation device, mobile phone or smart phone, personal computer, tablet device, etc. In the alternative, the navigation system 805 may be implemented in a vehicle as a dedicated vehicle navigation system.

Local navigation sensors 801 include compasses, accelerometers, speedometers, gyroscopes, and other sensors for detecting platform (vehicle) motion. A GPS receiver 802 is a device for receiving GPS signals from GPS satellites to determine the vehicle's coordinates (absolute position). The GPS receiver 802 can be installed on the vehicle but may be omitted if the navigation system 805 has its own GPS receiver 806.

A human-machine interface (HMI) 804 is a user interface for interactions between human and machine, which is typically a touch screen (display screen with touch sensors), a remote controller, a voice input/output device, etc. for input and output of messages and instructions. The HMI 804 may also be omitted if the navigation system 805 has its own user interface such as touch screen, etc. The Local navigation sensors 801, GPS receiver 802, and HMI 804 are connected to Bus/CAN network 803 so that each of the devices and the navigation system 805 are mutually communicable.

The navigation system 805 comprises a GPS receiver 806 that receives GPS signals from GPS satellites to determine the vehicle's absolute position, a CPU 807 that executes overall operations of the navigation system 805, a map database 812 that stores map data for navigation, positioning and map matching operations, route calculation, map image display, POI information, etc., and a positioning module 816. The positioning module 816 is a functional module implemented by steps executed by a processing unit (CPU) 807 to estimate the vehicle position based on data received from the GPS receiver 802, the local navigation sensors 801, the HMI 804, and the map database 812.

The positioning module 816 is comprised of a map matching module 808, dead reckoning module 809, integrity checking module 810, and candidate selection module 811. The functional steps accomplished by the positioning module 816 are described in detail in FIG. 5. The map matching module 808 can receive data from the GPS receiver 802, GPS receiver 806, the local navigation sensors 801, the HMI 804 and the map database 812 to match the vehicle's position to a digitized road network (map data). The dead reckoning module 809 has the functionality to use data from local navigation sensors 801 to estimate the vehicle trajectory. The integrity check module 810 has the functionality to evaluate user input received via the HMI 804 during a VP correction operation and validate the user input against the map matched result calculated by the map matching module 808. The candidate selection module 811 has the functionality to use data from the map matching module 808, local navigation sensors 801, GPS receiver 802, GPS receiver 806 and the map database 812 to determine possible road links for VP correction.

The navigation system 805 further comprises a route guidance module 813, display device and controller 814, and a route calculation module 815. The route guidance module 813 performs the route guidance operation to the destination specified by the user. The display device and controller 814 acts as a human-machine interface (HMI) and may be interchangeable with the HMI 804 noted above. The route calculation module 815 calculates a route from a start point to an end point in cooperation with the map database 812 and CPU 807. The route guidance module 813 generates maneuvers on the route calculated by the route calculation module 815 and output by the display device and controller 814.

Figure 7:
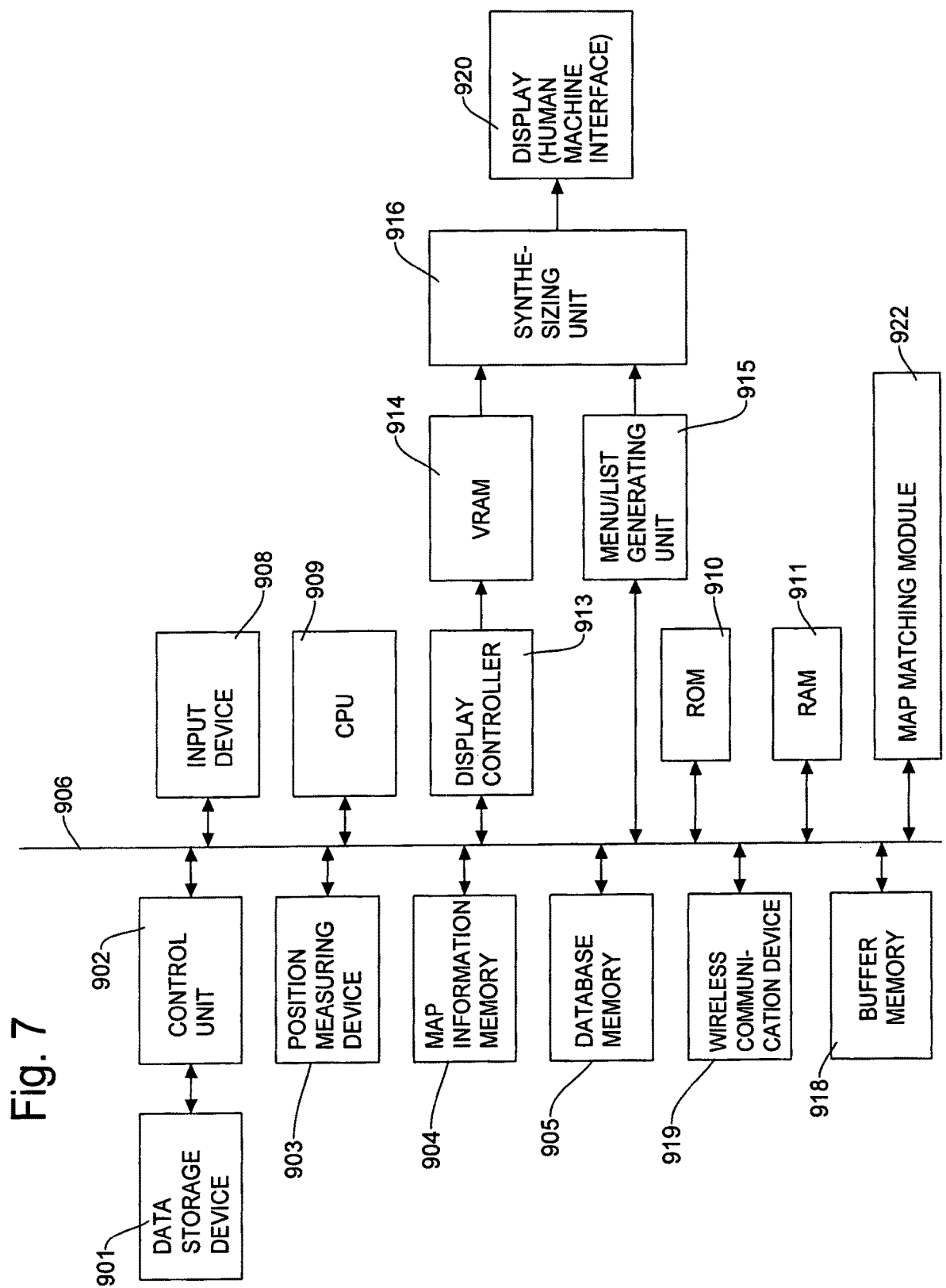
FIG. 7 is a functional block diagram illustrating an exemplary structure of a navigation system for implementing the present invention.

FIG. 7 is an embodiment of the structure of a vehicle navigation system for implementing the present invention of correcting a vehicle position by a user's input through a human-machine interface. While the vehicle navigation system is explained for an illustration purpose, the present invention can also be applied to other types of navigation systems, such as a portable navigation device implemented by a cellular phone (smart phone), laptop or a notebook computer, tablet device, etc.

In the block diagram of FIG. 7, the navigation system includes a data storage device 901 such as a hard disc, CD-ROM, DVD, flash memory, solid state drive, or other storage means for storing the map data. The navigation system includes a control unit 902 for controlling an operation for reading the information from the data storage device 901, and a position measuring device 903 for measuring the present vehicle position or user position. For example, the position measuring device 903 has a vehicle speed sensor or accelerometer for detecting a moving distance, a gyroscope for detecting a moving direction, a GPS (global positioning system) receiver for receiving GPS signals, a microprocessor for calculating a current vehicle position based on the moving distance, moving direction and GPS signals, etc.

The block diagram of FIG. 7 further includes a map information memory 904 for storing the map information which is read from data storage device 901, a database memory 905 for storing database information such as point of interest (POI) information which is read out from the data storage device 901, a human-machine interface (HMI) 908 for interaction between the navigation system and a user for executing a menu selection operation, an enlarge/reduce operation, a destination input operation, a vehicle position correction operation etc. The human-machine interface 908 can be a touch screen (combined with a display 920) or multi-touch device that receives input from a display by means of soft keys, or physical buttons located away from a display device. The human-machine interface 908 can also be a voice interface including a microphone and a speaker for voice communication between the navigation system and the user.

In FIG. 7, the navigation system further includes a bus 906 for interfacing the various units in the system which may form a Controller Area Network (CAN) of a vehicle as noted above, a processor (CPU) 909 for controlling an overall operation of the navigation system, a ROM 910 for storing various control programs, a RAM 911 for storing a processing result such as a guidance route, a display controller 913 for generating a map image on the basis of the map data, a VRAM 914 for storing images generated by the display controller 913, a menu/list generating unit 915 for generating menu image/various list images, a synthesizing unit 916, a wireless communication device 919 for wireless communication to retrieve data such as traffic conditions from a remote server, a buffer memory 918 for temporally storing data for ease of data processing, and a display (monitor) 920, and a positioning module 922 to calculate the current position with respect to digitized road data. The display 920 can also act as a human-machine interface in combination with the human-machine interface 908 in a manner shown in FIGS. 2A-2D, 3A-3C, 4.

The operational procedures of the present invention described in the flow charts described above are performed by the CPU 909. Specifically, the CPU 909 is configured to execute the software that performs the procedures described in the flow charts of FIGS. 4 and 5. The software program that performs the procedures described in the flow charts of FIGS. 4 and 5 is stored in the data storage device 901 or the ROM 910.

As has been described above, according to the present invention the navigation system accepts user-initiated correction of the current user position via the human-machine interface, performs an integrity check on the user selection, and updates the VP to a position in accordance with the integrity check. In many cases, the user knows the correct current position because of his/her past experience, or by the surrounding views such as buildings and shops, traffic signs, etc. Thus, when the navigation system shows an inaccurate current position, typically when GPS signals are weak or unavailable for a certain period of time, for example at least about 5 seconds, the user is able to initiate a VP correction by supplying location information to the navigation system according to his/her knowledge. The present invention provides various methods to assist the user to select a position and thereby enable the navigation system to calculate and display the correct position, update a calculated route and provide accurate and timely guidance to the user in cases where the navigation would have otherwise failed to do so.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. An apparatus for correcting a user position in a navigation system, comprising:
    one or more processors for controlling overall operations of the navigation system;
    a human-machine interface for interaction between the navigation system and a user, the interface further comprising at least a display;
    one or more navigation sensors configured to detect sensor data proximate to the user position;
    one or more positioning receivers of the navigation system which receives and analyzes positioning signals to estimate the user position;
    a map database which stores digital map data of road networks including at least coordinate positions and attributes of road segments and road nodes, and
    a positioning module configured to:
        receive an indication from the user that the user position is incorrect;
        examine by a first map-matching algorithm a map database and the sensor data to find at least one candidate position;
        present, via the human-machine interface, the at least one candidate position to the user;

receive from the user a selection from the at least one candidate, the selection indicating a location of the user as perceived by the user, perform an integrity check on the selection, wherein the selection is validated by determining whether the selection satisfies at least one of a threshold and a probability range, where the threshold is a set threshold for a map-matching probability and the probability range is a set range measured from a likeliest match; and update the user position on a digital map image displayed on the human-machine interface in accordance with the integrity check.

2. The apparatus of claim 1, wherein the positioning module is further configured to select the candidate position by the first map-matching algorithm, where the candidate position is proximate to at least one of a recent trajectory of the user based on data from one or more navigation sensors, and a calculated route.

3. The apparatus of claim 1, wherein the processor further conducts an operation of calculating a route between a start point and a destination specified by the user based on digital map data retrieved from the map database, and performing a route guidance operation to guide the user to the destination through the calculated route by showing upcoming maneuvers on the human-machine interface of the navigation system.

4. The apparatus of claim 2, wherein the at least one candidate position corresponds to a road link.

5. The apparatus of claim 2, wherein the at least one candidate position corresponds to a maneuver of the calculated route.

6. The apparatus of claim 2, wherein the at least one candidate position corresponds to a point-of-interest retrieved from the map database.

7. The apparatus of claim 2, wherein the positioning module is further configured to present the at least one candidate position to the user via the human-machine interface in a candidate list, and the at least one candidate position is identified in the candidate list by at least one of a road name, a directional identifier, and a point-of-interest name, corresponding to the candidate position.

8. The apparatus of claim 2, wherein the positioning module is further configured to present the at least one candidate position to the user via the human-machine interface on the digital map image, and the at least one candidate position is identified on the digital map image by at least one of a road name, a directional identifier, a point-of-interest name and a point-of-interest icon, corresponding to the candidate position.

* * * * *